United States Patent [19]
Pickett et al.

[11] Patent Number: 5,588,494
[45] Date of Patent: Dec. 31, 1996

[54] CROP INVERTER AND METHOD OF USING SAME

[75] Inventors: J. Paul Pickett; Dee L. Jones; Jay D. Christensen, all of Burley, Id.

[73] Assignee: Pickett Equipment, Burley, Id.

[21] Appl. No.: 519,316

[22] Filed: Aug. 25, 1995

[51] Int. Cl.⁶ ................................. A01D 29/00
[52] U.S. Cl. ................ 171/124; 171/1; 171/53; 171/111; 171/113; 460/126
[58] Field of Search ................. 171/1, 5, 6, 53, 171/55, 56, 111, 112, 113; 56/327.1; 460/126, 127, 129, 904

[56] References Cited

U.S. PATENT DOCUMENTS

| | | | |
|---|---|---|---|
| 2,522,644 | 9/1950 | Searcy | 171/113 |
| 2,869,652 | 1/1959 | Kline et al. | 171/115 |
| 2,956,628 | 10/1960 | Rogers et al. | 460/126 X |
| 3,024,849 | 3/1962 | Gregory . | |
| 3,059,703 | 10/1962 | Pearman . | |
| 3,106,250 | 10/1963 | Gregory . | |
| 3,181,617 | 5/1965 | Wallace . | |
| 3,241,619 | 3/1966 | Morrow . | |
| 3,637,023 | 1/1972 | Wood . | |
| 3,791,451 | 2/1974 | Zaun et al. | 171/113 X |
| 4,166,505 | 9/1979 | West | 171/1 |
| 4,588,033 | 5/1986 | Orthman | 171/62 |
| 4,629,005 | 12/1986 | Hood, Jr. et al. | 56/327.1 X |
| 4,633,955 | 1/1987 | Gresham . | |
| 4,687,064 | 8/1987 | Johnson | 460/127 X |
| 4,921,050 | 5/1990 | Brown | 171/6 X |
| 4,934,461 | 6/1990 | Spears, Sr. et al. . | |
| 5,099,636 | 3/1992 | Yoder | 56/327.1 |
| 5,350,020 | 9/1994 | Vandever et al. | 171/62 X |

OTHER PUBLICATIONS

Digest: titled: Peanut Digger Shaker Inverter.
Digest: titled: Peanut Digger and Windrower.

*Primary Examiner*—Terry Lee Melius
*Assistant Examiner*—Victor Batson
*Attorney, Agent, or Firm*—Thorpe, North & Western

[57] ABSTRACT

A crop inverter is disclosed for digging and inverting crops, such as peanuts, which have pods disposed below the soil. The inverter typically includes a pair of rotating bars for severing the roots extending downwardly from the pods, and for lifting the pods to the surface of the soil. A pick-up mechanism raises the plants above the ground, and a slinging mechanism removes soil from the pods while conveying the pods to an inverter. The inverter causes the plant to come to rest with the peanut pods on top, without causing unnecessary loss of pods. The inverter typically includes a plurality of augers which extends rearwardly relative to the direction of travel, so that the peanut plants move along the auger until they are ready to be inverted. A mounding plate or other mechanism may also be provided to form a new mound below the row of inverted peanut plants.

45 Claims, 7 Drawing Sheets

CROP INVERTER AND METHOD OF USING SAME

BACKGROUND OF THE INVENTION

The present invention relates to a machine for digging and inverting crops, and in particular, a machine for digging peanuts and depositing the peanut plant in a windrow so that the peanuts pods are positioned on top of the foliage.

The raising and harvesting of peanuts includes numerous problems which, if not resolved properly, can result in significant hardship for the farmer. Unlike many crops, peanuts have a very short harvest window in which the peanuts may be harvested while obtaining close to the maximum yield. If the peanuts are harvested too early, a considerable amount of the crop will be immature and unusable. If the peanuts are harvested too late, many of the peanuts will have rotted, and the effective yield will be decreased.

While the exact harvest window varies by the type of peanut, a typical harvest time for a peanut is 145 days, with the harvest window being plus or minus 4 days. This narrow window requires that farmers harvest the peanuts as rapidly as possible, once within the window, in order to avoid the risk that the harvest will not be completed within the window due to bad weather and other problems. Those familiar with large peanut farms will appreciate that it can take several days of nonstop work to harvest the peanuts. If bad weather or other conditions prevent harvesting for a month, for example, the loss of yield will be about 40 percent. Repeated loses of such a nature can easily drive a farmer out of business.

An additional problem faced by peanut farmers is that there are four major types of peanuts, each of which has different harvesting characteristics which must be considered. Runner type peanuts are so called because the peanut plants have long branches which extend along the ground. Runner type peanuts are known for their high yields and are thus popular with farmers.

In contrast to the long branches of the Runner type peanut, the foliage of the Valencia type of peanut is what is commonly referred to as bunch type foliage. With bunch type peanuts, the foliage extends above the ground more vertically than horizontally. The Valencia type peanut is known for the large number of peanuts per pod, and for having a weak connection which holds the peanut pod to the remainder of the plant, commonly referred to as the peg.

Another type of peanut is the Spanish type. The Spanish type peanut have decumbent foliage, which is foliage having characteristics between that of the more vertical bunch type and the more horizontal runner type. Spanish type peanuts are known for their unique flavor.

Yet another type of peanut is the Virginia. The Virginia is decumbent to runner type in foliage and is known for producing high yields of large individual peanuts. Because of the different characteristics of the various types of peanuts, i.e. their foliage type and the strength of their pegs, it is difficult to design a single harvesting machine which can efficiently harvest the different types of peanuts without causing significant amounts of harvesting loss with any particular type.

Yet another problem with harvesting peanuts is that of aflatoxin. Aflatoxin is a mold which grows on peanuts when the internal moisture is between 22% and 40% for more than three days. Aflatoxin is lethal to humans if ingested. Therefore, Federal regulations strictly limit use of peanuts having a detectable amount of aflatoxin contained thereon.

To prevent losses due to aflatoxin, and to improve the flavor of several types of peanuts, the peanut pods are left to dry or cure in the sun. This is typically done by turning the peanut plant over when the peanut pods are pulled from the ground. The peanut pods are left resting on the foliage until they have dried to a desired moisture content, and are then collected using a combine.

Because the peanut pods are of greater density than the attached foliage, there is a tendency for the peanut pods to stay on the bottom during harvesting. Thus, it is necessary to mechanically turn the plant over so that the foliage comes to rest on the bottom.

To accomplish the proper placement of the peanut pod several harvesting machines have been developed. One such machine, shown in FIG. 1A, has a cutting blade 20 which travels several inches below the surface of the ground in order to uproot the peanut plants. Revolving conical drums 24, each with a plurality of fingers 28 attached thereto, are disposed directionally behind the cutting blade 20. The revolving drums 24 revolve in a direction opposite the forward direction of movement. In other words, the drums 24 rotate opposite the direction of the wheels of the tractor 32 to which they are attached.

Figure 1A:
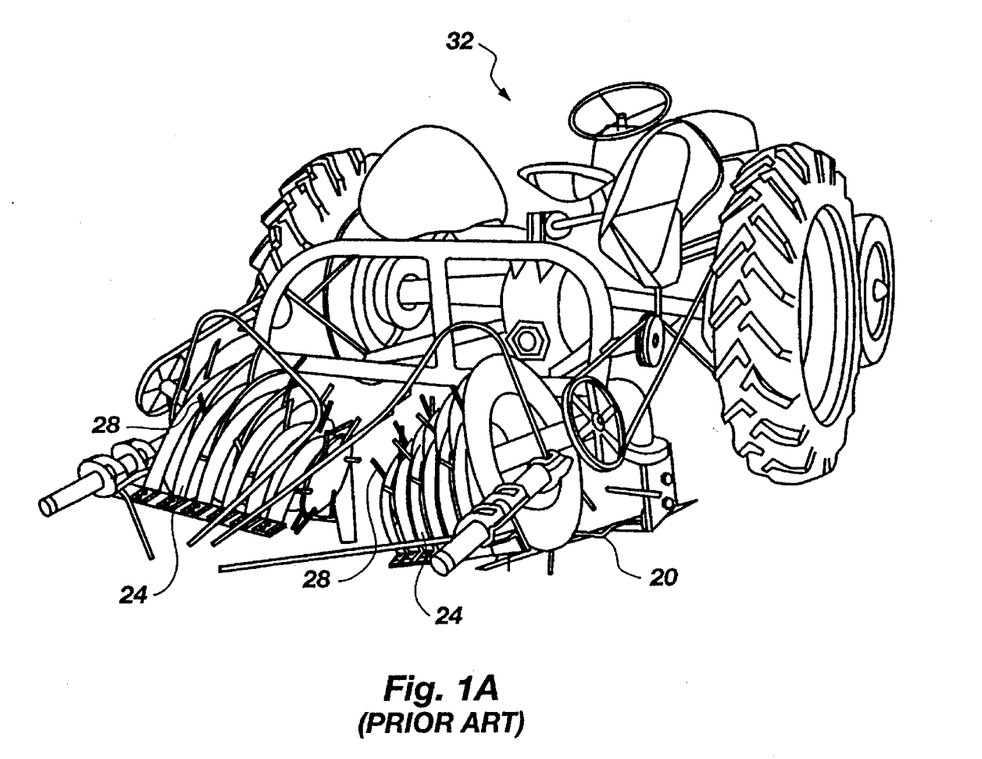
FIG. 1A shows a peanut digger/inverter of the prior art.

After the roots of the peanut plant below the pod are sheared off by the cutting blade 20, the peanut plant is pulled over one of the revolving drums 24. As the peanut plant is pulled over the revolving drums 24, soil is knocked from around the peanut pod, and the peanut plant is inverted so that the plants come to rest in a windrow with the pods on top of the foliage.

Two primary disadvantages with the machine described are the speed at which the machine operates and the amount of the harvest loss, i.e. the amount of peanuts which are lost during harvesting procedures. A typical peanut inverter operates at between 2.5 and 5 miles per hour, and most typically about 3 miles per hour. While many machines will travel above this speed, the amount of pods lost as the peanut plants are inverted increases significantly as the speed is increased. Additionally, the machines often have loss levels which are significant enough to cost the farmer large sums of money.

Figure 1B:
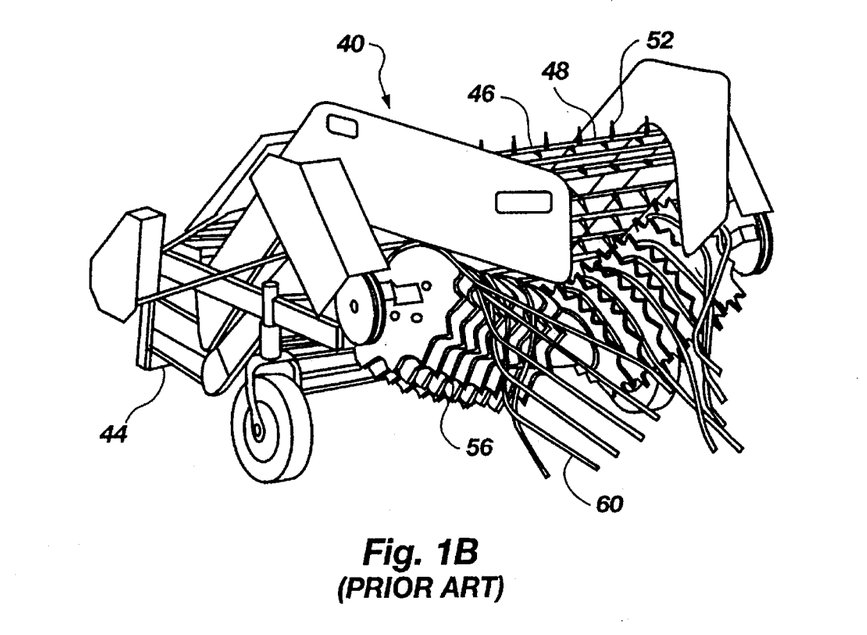
FIG. 1B shows another peanut digger/inverter of the prior art.

Another approach to digging peanut plants is shown in FIG. 1B. The machine 40 has a cutter blade 44 which shears the peanut plant's roots below the pods, in a similar manner to that discussed above. The soil and peanut plants are then moved onto a conveyer belt 46 formed of a plurality of knocker bars 48 with spikes 52 disposed thereon. As the vines are carried up the conveyer belt 46 by the knocker bars 48, they are agitated to cause the soil to separate from the pods and fall between the knocker bars forming the conveyer belt.

Once at the top of the conveyer belt, the peanut plants fall onto a revolving inverter 56. The peanut plants are then passed along rigid guide bars 60 so as to form an inverted windrow.

The primary disadvantage with such an embodiment is that the machine must be moved rather slowly, i.e. about 3 miles per hour, to avoid excessive loss of the peanuts. If higher speeds are obtained, the agitation is increased to remove the soil in less time. However, this also causes a significant increase in the loss of peanut pods.

Figure 1C:
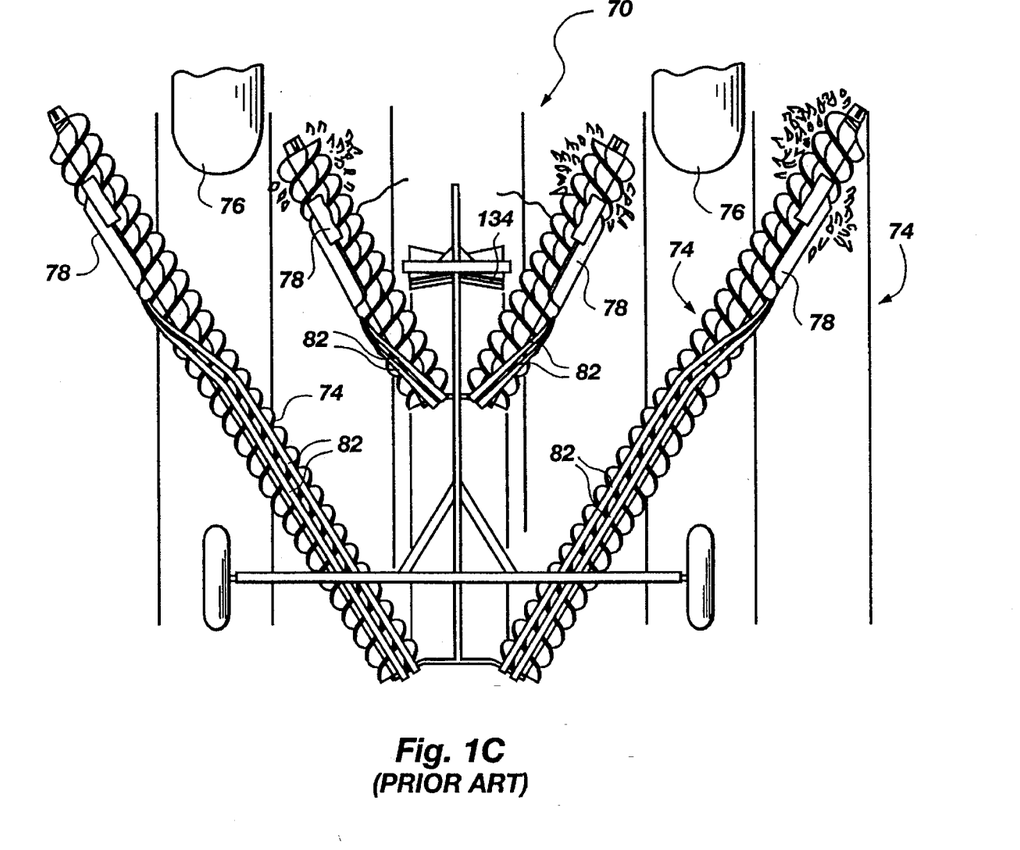
FIG. 1C shows still another digger for root crops made in accordance with the teachings of the prior art.

Yet another attempt to more efficiently harvest peanut plants is shown in FIG. 1C. The machine 70 has a plurality of augers 74 which rotate as the tractor (the wheels of which are shown at 76) is driven along the peanut plants. A cutting edge 78 rotates about each auger 74 and lifts the peanut plants into a pair of guides 82 which extend along the augers. The peanut plant is typically placed in the auger so that the peanuts are disposed on a side of the guides 82 opposite the auger 74, and so that the foliage remains in contact with the auger. As the auger 78 rotates, the foliage, and thus the remainder of the plant, is carried along the guides, and eventually left in an inverted windrow.

The primary disadvantage with such an arrangement is, once again, the speed at which the machine can harvest peanuts without sustaining substantial losses. If run too fast, numerous peanuts will be lost. Running the machine slow enough to harvest most of the peanuts, however, risks a delay in harvest due to bad weather or other interferences.

Thus there is a need for a crop inverter which will dig and place peanut plants in a windrow wherein the peanut plants are inverted while traveling at a relatively high rate of speed, and without a substantial loss of peanut pods.

SUMMARY OF THE INVENTION

Thus, it is an object of the present invention to provide an improved crop inverter which can properly dig and invert peanut plants while maintaining a relatively high speed.

It is another object of the present invention to provide such a crop inverter which is economical to operate.

It is yet another object of the invention to provide a crop inverter which inverts the peanut plant with less loss of the pods while traveling at a relatively high rate of speed.

Still another object of the invention is to provide such a crop inverter which enables the farmer to adjust the inverter for different row spacings.

An additional object of the invention is to provide such a crop inverter which removes soil and other debris without causing excess loss of the peanut pods.

The above and other objects of the invention are realized in specific illustrated embodiments of a crop inverter having a rotating cutting rod for shearing the peanut plant below the pods. Once sheared, the peanut plant and the soil surrounding it contact a lift/separator device, which sperate soil from the peanut plants as the plants are being moved out of the soil. A pick-up head lifts the peanut plants above the ground and passes them to a slinging device, while removing soils from the plants. The slinging device further removes soil from the peanut plants and moves the plants generally rearwardly. From the slinging device, the plants are passed to an inverter which impacts the peanut plants at a transverse angle, so as to invert the plant, while minimizing the loss of peanut pods.

In accordance with one aspect of the invention, the lift/separator is a rotating kicker tube which forces the peanut plant from the soil while removing soil from around the peanut pods. The kicker tube provides directional movement to the plants, without jarring them sufficiently to break off the pods.

In accordance with another aspect of the invention, the pick-up head includes a plurality of fingers for lifting the peanut plants. The fingers of the pick-up head are pivotally attached so that the fingers have a small amount of give when picking up or releasing the foliage of the peanut plants so as to enable the fingers to avoid entanglement with the foliage.

In accordance with another aspect of the invention, a pair of rotating slinger tubes are disposed adjacent the pick-up head to maintain the flow of peanut plants through the inverter. The rotating slinger tubes remove additional soil from the peanut plants and pass the plants to an inverting mechanism.

In accordance with another aspect of the present invention, the inverting mechanism is formed by a rotating auger which is disposed so that a long axis of the auger extends in generally the same direction as the direction of travel of the crop inverter. A positioning rod is used to direct the peanut plants onto the auger.

In accordance with yet another aspect of the invention, a flighting is disposed on the auger to channel peanut plants away from the auger.

In accordance with still another aspect of the invention, a trip rod is disposed adjacent the flighting and positioned to contact the peanut plant so that the plant inverts as it is pushed away from the auger and falls to the ground.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 2:
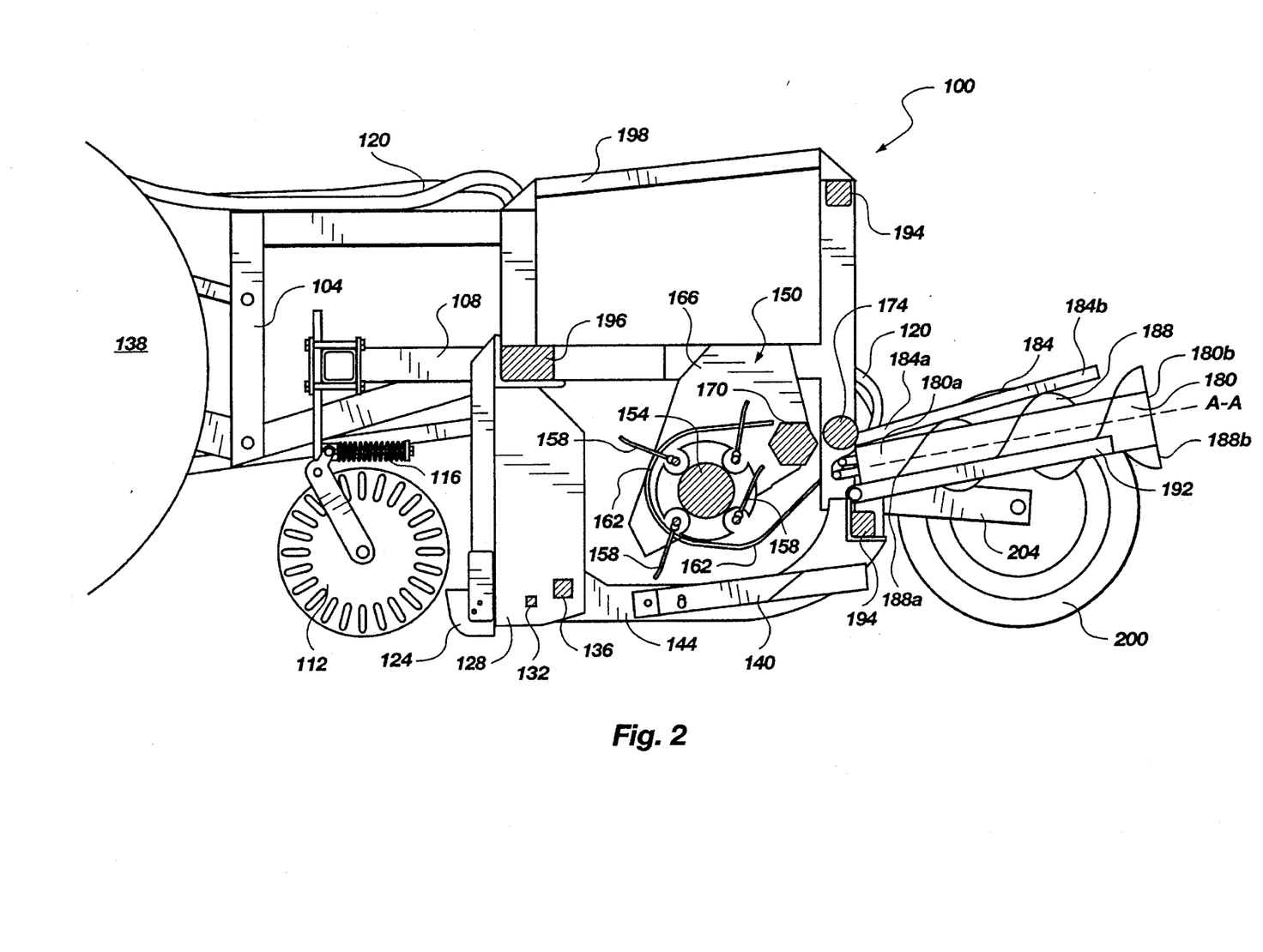
FIG. 2 shows a side cross-sectional view of a crop inverter made in accordance with the principles of the present invention.

Referring to FIG. 2, there is shown a side cross-sectional view of the major components of a crop inverter, generally indicated at 100, made in accordance with the principles of the present invention. Beginning at the left side of FIG. 2, the crop inverter 100 is connected to a conventional tractor (not shown) by a three point hitch 104, in a manner which will be well known to those skilled in the art.

Disposed slightly behind the three point hitch 104 is a coulter mount 108 for holding a coulter 112 and a coulter spring 116. Those familiar with the art will recognize that such coulters are well known and commonly used in peanut harvesting to cut and separate the peanut plants. Also shown on the left of FIG. 2 are a pair of hoses 120 for hydraulically operating various components of the crop inverter 100.

Adjacent the coulter 112 is a replaceable wear point 124. The wear point 124 is disposed at the bottom of the inverter 100 and is used to prevent rocks and other material from damaging the inverter. As the inverter 100 is pulled along the ground, the wear point 124 deteriorates and is eventually replaced. Rearward of the wear point 124 is a chain case 128 for directing power from the tractor PTO (not shown) to a cutter bar 132 & kicker tube 136, causing them to rotate.

Disposed adjacent the chain case 128 is an elongate, rotating cutter rod or bar 132. The cutter bar 132 typically has a generally square cross-section which is about 1 inch by 1 inch. When the crop inverter 100 is in use, the cutter bar 132 travels at ground level, through a mound, rotating about its long axis at a high rate of speed. As is shown and discussed in additional detail in FIG. 2, peanuts are conventionally grown in mounds which are about 5 inches deep. By moving along at the level of the ground and below the level of the mound, the rotating cutter bar 132 cuts through the mound below the location of the peanut pods, thereby severing the roots of the peanut plants and facilitating removal of the plants for further processing. Preferably, the cutter bar 132 rotates opposite a forward direction of movement. In other words the cutter bar 132 rotates so that it would travel the opposite direction of the crop inverter 100 if it were not held in place by the inverter.

Disposed rearward from and slightly higher than the cutter bar 132 is a second rotating member referred to as a kicker bar or kicker tube 136. The kicker tube 136 is disposed at about the same level as the peanut pods (FIG. 3) and rotates about its long axis so as to lift the pods. Typically, this is done by having the kicker tube 136 rotate in the opposite direction than wheels 138 (fragmented) of the tractor pulling the inverter, and in the same direction as the cutter bar 132.

As the pods are lifted, they are separated from the soil of the mound. The soil falls over the kicker bar 136 and is subsequently formed into a new mound by a mounder bar 140 mounted to the belly shank 144. The new mound is formed in the location which the inverted windrow of peanut plants will be formed. As will be discussed in additional detail below, the mound helps to cure the plants by channeling rainwater away from the peanut pods, thereby preventing the peanuts from resting in puddles of the rainwater. The mound also facilitates the subsequent thrashing of the peanut plants by a combine, by lifting the peanut plants above ground level so they are more accessible.

Rearward and upward from the kicker tube 136, and above the mounder bar 140 is a pick-up mechanism 150. The pick-up mechanism has a rotatable pick-up head tube 154 which is typically powered by the hydraulic hoses 120 which are attached to the tractor (not shown). The hydraulic hoses 120 allow the person driving the tractor to modify the rate at which the pick-up head rotates. As with the cutter bar 132 and the kicker tube 136, the pick-up head tube rotates in a direction opposite the direction of travel.

A plurality of elongate fingers 158 are attached to the pick-up head tube 154 and extend outwardly therefrom so as to engage foliage when the pick-up head tube is rotated. While shown in FIG. 2 as being a single series of fingers disposed about the pick-up head tube 154, in perspective numerous series of such fingers are disposed along the length of the pick-up tube. Of course, the fingers 158 could also be disposed along the pick-up head tube 154 so that they are not in a straight series. For example the fingers 158 could be disposed in an alternating pattern, or in a series of offset rows.

As the fingers 158 are rotated by the pick-up head tube 154, the foliage is carried over the pick-up head tube 154. A plurality of rotor rods, such as rod 162, are disposed about the pick-up head tube 154 to prevent foliage from becoming entangled in the head tube and fingers. The rotor rods 162 are spaced sufficiently far apart so that material other than foliage, e.g. soil, can pass downwardly through the rods and land on the soil below the inverter 100. Typically, the rotor rods 162 are spaced between 2 and 4 inches away from each other.

A foliage shield 166 can also be provided to channel the foliage past the pick-up head tube 154. The foliage shield 166 limits the height of the peanut plants moved by the fingers 158 and keeps them moving in the desired direction.

Once past the pick-up mechanism 150, the peanut plants move to a first slinger tube 170 with a hexagonal cross-section. The first slinger tube 170 rotates in a similar direction as the cutter bar 132, the kicker tube 136 and the pick-up head tube 154. The first slinger tube 170 performs two functions. First, the tube 170 provides consistent and continuous movement to the peanut plants. Second, the corners of the first slinger tube 170 vibrate the peanut plant in order to knock soil and other foreign materials from the plants as they pass over the first slinger tube.

A second slinger tube 174 is disposed adjacent to the first slinger tube 170 maintains the continuous movement of the peanut plants. The second slinger tube 174 is spaced sufficiently far from the first slinger tube 170 to allow foreign matter to fall between the two tubes and to the ground below.

The second slinger tube 174 is generally round in cross-section and continues movement of the peanut plants onto a auger 180 disposed at the back end of the crop inverter 100. The auger 180 is disposed so that its long axis extends rearwardly from the slinger tubes.

The auger 180 is formed of a pipe approximately 6.5 inches in diameter. The auger 180 has a first end 180a which is connected to a support frame adjacent the second slinger tube 174, and a second end 180b which is usually unattached. Of course a support bar could be used to attach the second end of each auger if desired.

As is apparent from FIG. 2, the second end 180b of the auger 180 is generally positioned higher than the attached first end 180a. This provides an incline which may be between 1 and 20 degrees, but is typically about 10 degrees.

A positioning rod 184 is disposed adjacent to the auger 180 to ensure that the plants contact the auger. The positioning rod 184 may be parallel to the auger, or may be inclined slightly so that a first end 184a of the positioning rod 184 is closer to the auger 180 than a second end 184b.

The auger 180 has a tapered flighting 188 disposed thereabout. Typically the flighting 188 will increase in size as it extends from the first end to the second end of the auger 180. Because the auger 180 is disposed generally parallel to the direction of travel and rotates tangential thereto, the peanut plants have a tendency to slide along the auger. However, the flighting 188 gently forces the peanut plants from the auger 180. For these reasons, it is anticipated that the flighting 188 and the auger 180 will be covered with plastic or some other material to which soil and other material will generally not adhere. Of course, uncovered metal augers 180 and flightings 188 work as well. In a preferred embodiment, a first end 188a of the flighting 188 extends less than one inch from the auger 180, while a second end 188*b* extends approximately four inches from the auger.

Disposed adjacent the auger 180, and about 1 to 2 inches below the central axis A-A about which the auger rotates is a trip rod 192. The trip rod 192 is typically disposed between about 1 and 10 inches from the auger 180. As the flightings 188 force the peanut plants off of the auger 180, the plants will fall toward the ground. As they do so, the plants contact the trip rod 192. The effect of contacting the trip rod 192 is to cause the plant to invert so that when the plant lands on the ground, the peanut pods are disposed on top of the resulting windrow.

To hold the respective portions of the inverter together, conventional frame tubing, such as that identified at 194 is used. Additionally, a tool bar 196 and a guy rod 198 are provided for fastening the separate parts of the inverter together. The geometry or the tool bar 196, guy rod 198 and frame tube 194 form a solid unit which has sufficient strength to hold the individual parts of the inverter in their proper positions.

Also shown in FIG. 2 is a wheel 200 which is attached to the frame 194 by an adjustable wheel support 204. The adjustable wheel support 204 may allow the user to adjust the position of the wheel 204 relative to the height of a tractor (not shown) pulling the inverter 100, so as to maintain the inverter in the proper orientation. Adjustability is convenient, as a farmer will often have tractors of different sizes. Alternatively, the hitch 104 may be adjusted to compensate for different height of trailer hitches.

Figure 3:
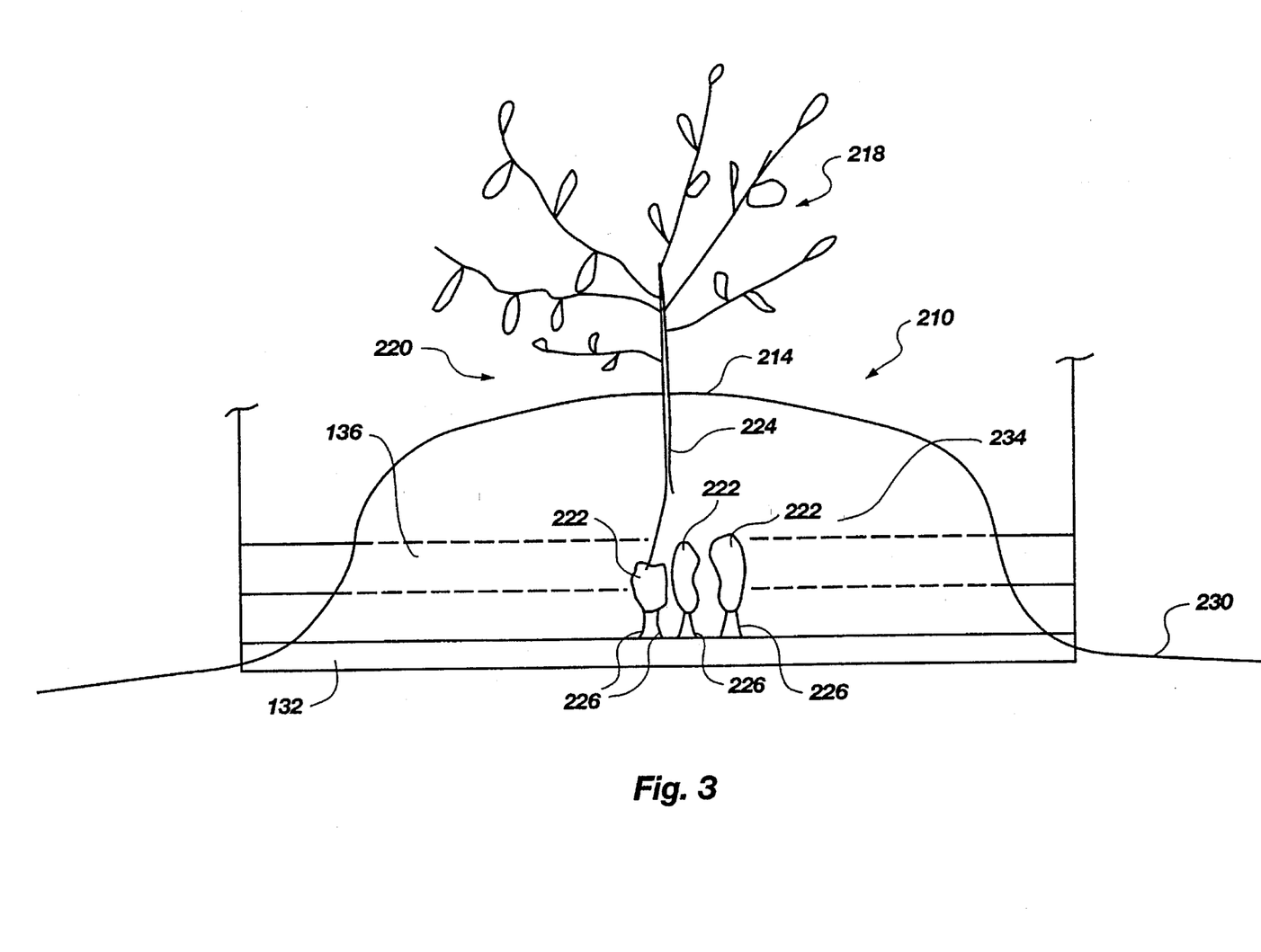
FIG. 3 shows a cross-sectional view of a peanut plant disposed in a peanut mound, and a cutter bar and kicker tube positioned within the mound.

Referring now to FIG. 3, there is shown a cross-sectional view of a peanut mound, generally indicated at 210, with a cutter bar 132 and kicker tube 136 disposed therein. The peanut mound 210 has a crest or top 214 out of which the foliage 218 of the peanut plant 220 extends.

Disposed within the peanut mount 210 below the crest 214 are a plurality of peanut pods 222 with tap roots 226 extending downwardly therefrom. When the peanut plants 220 are harvested, the cutter bar 132 is disposed so as to pass below the peanut pods 222. Thus, the center of the cutter bar 132 is positioned about 5 inches below the crest 214, and about even with ground level 230.

As the cutter bar 132 moves through the peanut mound 210, the cutter bar rotates such that it is opposed to the direction of movement. In other words, if the wheel 200 (FIG. 2) supporting the inverter 100 (FIG. 2) is rotating clockwise, the cutter bar 132 would rotate counter-clockwise from the same reference point. As the cutter bar 132 so rotates, the cutter bar severs the tap roots 226 of the peanut pods 222, thereby enabling the peanut pods to be pulled from the ground.

The kicker tube 136 is disposed rearwardly from the cutter bar 132 and approximately 1 and one-half inches higher. Thus, the kicker tube 136 is disposed at approximately the same height as the peanut pods 222 to be harvested.

As the crop inverter 100 is drawn through the peanut mound 210, the kicker tube 136 rotates in the same direction as the cutter bar 132. The rotational momentum of the kicker tube 136 is transferred to the soil 234 surrounding the peanut pods 222 and creates a wave of soil near the crest 214. This wave lifts the peanut plant 220 much in the same way a wave of water will lift a buoy. Because the momentum is transferred to the soil, the peanut pods 222 and the pegs 224 (the portion which holds the pods to the foliage 218) remain intact. As a substantial portion of the soil 234 has already been removed from around the pods 222, less effort must be expended in removing soil subsequent to digging.

Figure 4:
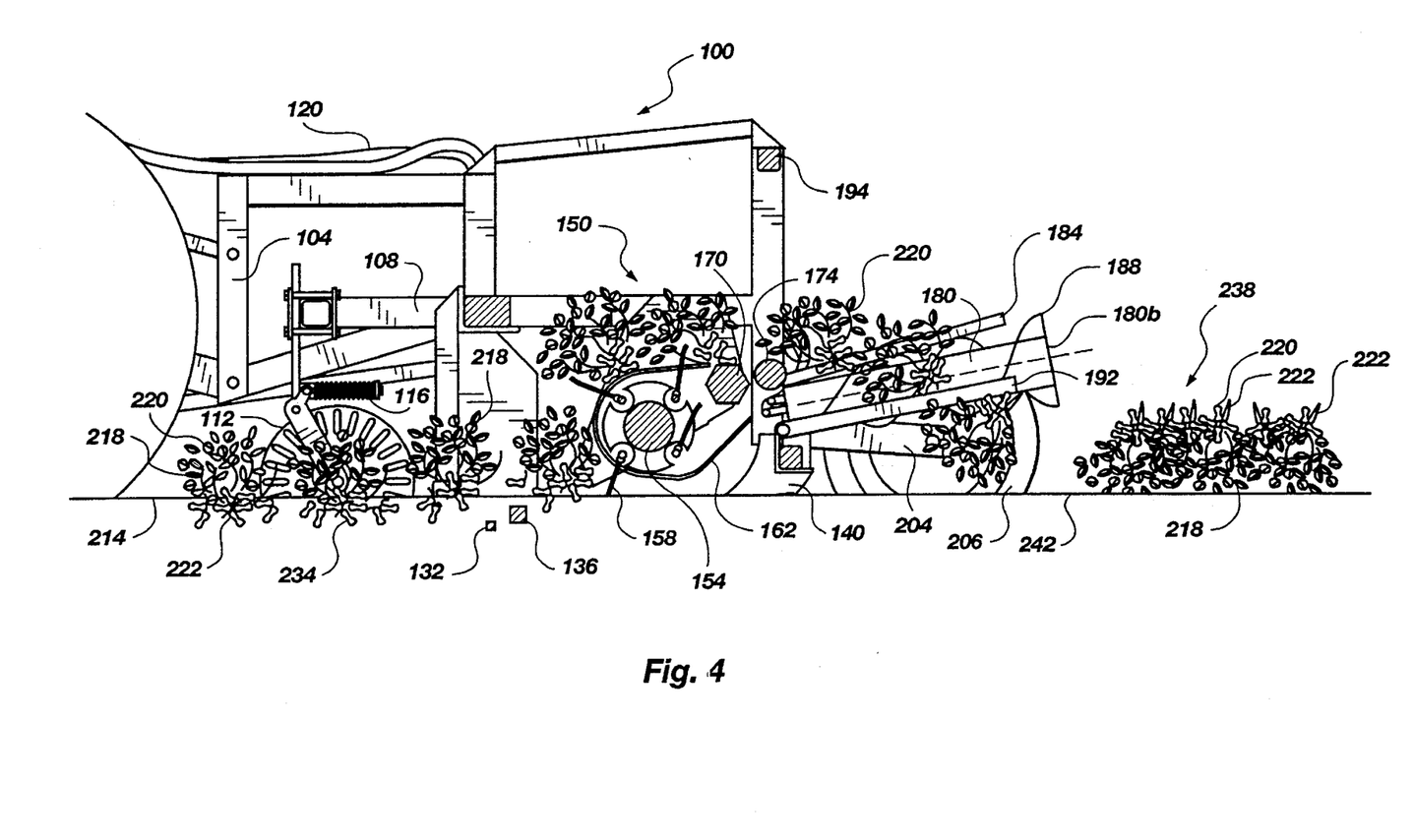
FIG. 4 shows a side cross-sectional view of a crop inverter of the present invention, similar to that shown in FIG. 2, in which the crop inverter is harvesting peanut plants.

Referring now to FIG. 4, there is shown a side cross-sectional view of a crop inverter 100 similar to that shown in FIG. 2. The crop inverter 100 is disposed so as to harvest peanuts in the manner described above.

Prior to harvesting, a farmer will inspect the crop inverter 100 to ensure that all of the bearings and other parts of the inverter are in appropriate shape. Any broken parts should be repaired or replaced prior to using the inverter. Additionally, the farmer should wait a sufficient time following irrigation or the last rain to minimize the amount of soil which will cling to the peanut plants 220 when harvested.

When the soil is sufficiently dry, the inverter 100 is disposed so that the coulter 112 extends approximately 4 inches into the mound, the crest of which is identified in FIG. 4 as line 214. The coulter 112 clips and separates the foliage 218 to enable the uniform inversion of the individual rows of peanut plants 220.

Once the coulter 214 has clipped and separated the peanut plants 220 as described above, the cutter bar 132 severs the tap roots 226 (FIG. 3). The peanut pods 222 are then loosened from the soil 234 and lifted by the rotation of the kicker bar 136.

As the severed peanut plant 220 rises to the crest 214 of the mound 210 (FIG.2), it is lifted by the pick-up mechanism 150. The elongate fingers 158 are moved in a generally circular pattern by the pick-up head tube 154 and are passed along the rotor rods 162, which prevent the foliage 218 from getting tangled in the pick-up head tube. The fingers 158 are able to pivot as they rotate around the pick-up head tube 154. The pivoting allows the fingers to withdraw from the peanut plants 220 without becoming tangled in the plants, thereby allowing smooth and continuous flow through the inverter 100. This is also aided by the rotor rods 162 disposed about the pick-up head tube 154.

The peanut plants 220 are then passed to the first slinger tube 170. The hexagonal cross-section of the first slinger tube 170 moves the peanut plants 220 at a continuous pace, while simultaneously knocking additional soil from the plant as each of the edges of the tube contact the plant. Of course, other cross-sectional shapes such as a square, a pentagon, a heptagon or octagon will also work, although to different levels of success. The hexagonal cross-shaped tube is used in that it works well, and is more readily available than most of the other shapes identified.

From the first slinger tube 170, the peanut plants 220 are passed to a second slinger tube 174 which continues the movement of the plants. The second slinger tube 174 passes the peanut plants 220 to the rotating auger 180 with the aid of a positioning rod 184.

Once on the auger 180, the peanut plants 220 have a tendency to maintain their direction of travel even though the auger is rotating. However, the flighting 188 is disposed on the auger 180 to prevent the peanut plants 220 from simply traveling along the auger and off the second end 180*b*. The flighting 188 will typically increase in size along the auger 180. As the peanut plants 220 travel along the auger 180, they are relatively gently pushed off by the flighting 180. As they are pushed off the auger 180 by the flighting 188, the tap roots 226 (FIG. 3), and/or pods, of the peanut plants 220 contact the trip rod 192. The trip rod 192 will not hold up the entire peanut plant 220. Rather, it merely restricts movement of the tap root 226 and thereby uses the peanut plant's 220 own force to cause rotational movement in the plant. The peanut plant 220 continues the rotational movement as it falls from the trip rod 192. The peanut plants 220 then land on the soil with the foliage 218 down and the peanut pods 222 resting on top of the windrow 238.

While the peanut plants 220 are being processed in the above described manner, the mounder bar 140 forms new mounds from the soil. The mounds, indicated by the line at 242, are positioned below the point at which the windrow 238 is formed. In a typical embodiment, the crop inverter 100 described above will simultaneously process two or four rows of peanut plants 220, and merge the plants so that they form one or two windrows, respectively. Thus, for a mound 242 to be positioned under the windrow 238, a new mound must be formed from the soil.

The advantages of forming a new mound primarily relate to improved drainage and harvesting. If it rains after the peanuts are harvested, positioning the peanut plants on a mound will help to channel the rainwater away from the peanut pods, and will enable the pods 222 to dry more rapidly. Thus, the risk of mold or other diseases growing on the peanut pods 222 is significantly reduced. When harvesting the peanuts, the mound beneath the windrow 238 raises the windrow and facilitates collection of the peanuts with a combine.

The above described digging of the peanut plants 220 provides a smooth continuous processing which results in the peanut pods 222 being properly positioned in the windrow 238. It also allows the inverter 100 to be run at speeds much higher than conventional peanut diggers while having the same or less harvesting loss. By increasing the speed, the farmer is able to start harvesting the windrows earlier, or to spend time on other activities.

Figure 5:
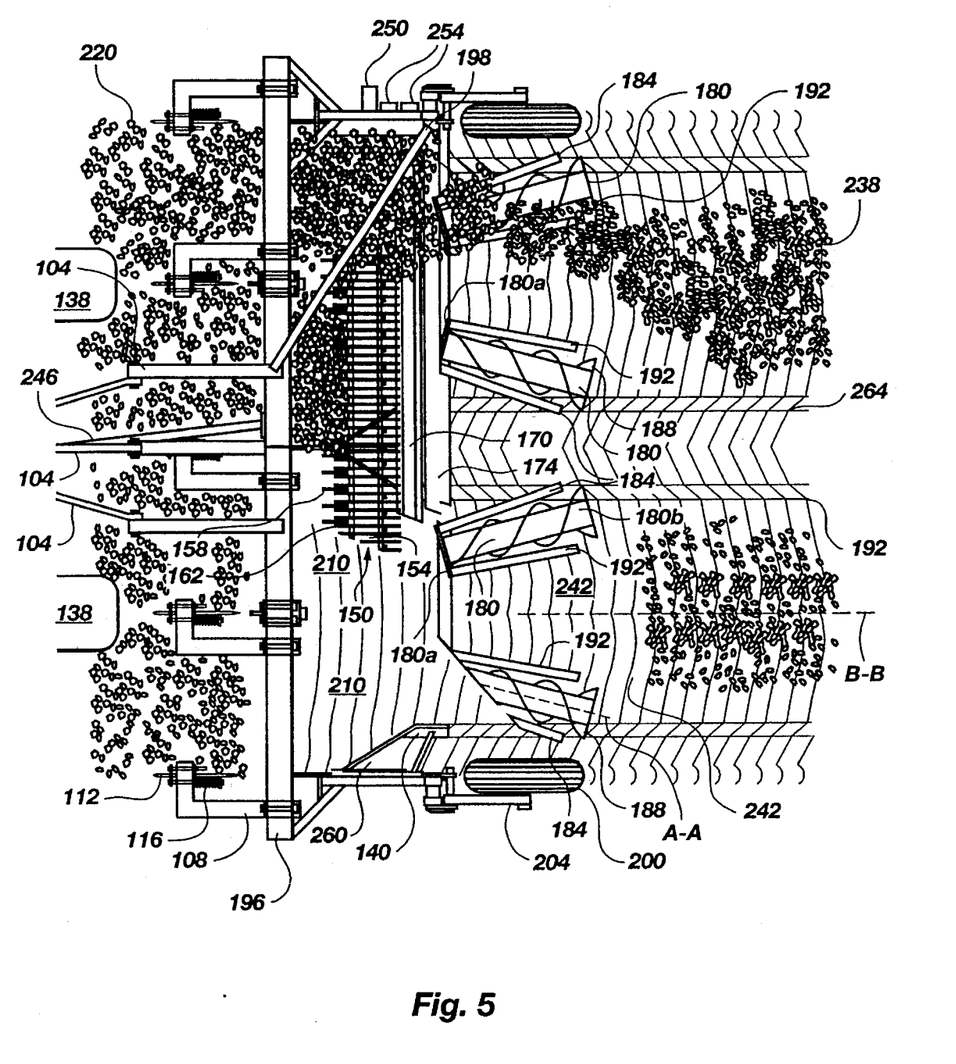
FIG. 5 shows a top, partially cut-away view of a crop inverter made in accordance with the principles of the present invention.

Referring now to FIG. 5, there is shown a top, partially cut-away view of the crop inverter 100. Beginning at the left, there is shown a fragmented view of the wheels 138 of a tractor (not shown) which is used to pull the crop inverter 100. The crop inverter 100 is connected to the tractor by the three-point hitch 104. The three-point hitch 104 is attached to the tool bar 196 and the guy rod 198. The tool bar 196 supports the coulters 112 and the coulter springs 116.

Disposed adjacent the three-point hitch 104 is a drive line 246 which is connected to the cutter bar 132 (FIGS. 2–4) and the kicker tube 136 (FIGS. 2–4) so as to rotate the cutter bar and the kicker tube opposite to the forward direction of travel as discussed above with respect to FIGS. 2 through 4.

Disposed rearwardly of the tool bar 196 is a fragmented view of the pick-up mechanism 150, including the pick-up head tube 154 and the pivoting fingers 158. The pick-up mechanism 158 is hydraulically operated via the hydraulic motor 250, the hydraulic flow controls 254 and the hydraulic hoses 120 (FIGS. 2 and 4). The hydraulic flow controls 254 enable the farmer to control the rate at which the pick-up mechanism 150 functions. When the harvest is unusually light or unusually heavy, the speed of the pick-up mechanism 150 can be modified to compensate for the volume of peanut plants being passed through the inverter.

The first slinger tube 170 and the second slinger tube 174 are also hydraulically controlled, and are matched to the speed of the pick-up mechanism 150. If the speeds of the slinger tubes 170 and 174 were not matched, or slower than that of the pick-up mechanism 150, the peanut plants 220 would get caught up in the pick-up mechanism. By matching the slinger tubes 170 and 174 to the speed of the pick-up mechanism 150, a continuous flow of the peanut plants 220 is assured, and less peanut pods 222 are lost in the harvesting process.

Once over the slinger tubes 170 and 174, the peanut plants 220 contain very little soil. The peanut plants 220 are then passed onto the auger 180. In FIG. 5, it is shown that the central (long) axis A-A of the auger 180 is orientated slightly transverse to the direction of travel B—B of the crop inverter 100 (which is perpendicular to the long axis of the pick-up head tube 154 and the slinger tubers 170 and 174. While the present invention will work adequately with the augers positioned up to 45 degrees transverse to the direction of travel B—B, the auger 180 is generally disposed between 0 and 30 degrees transverse to the direction of travel, and preferably about 15 degrees. In such a position peanut plants 220 may be inverted with less direct force to the plant, thereby resulting in less loss when run at high speeds.

As will be appreciated by the arrangement of FIG. 5, the augers 180 are grouped into pairs, such as the two augers toward the top of FIG. 5 and the two augers toward the bottom of FIG. 5. The augers 180 rotate in opposite directions so that the peanut plants 220 passing over each pair of augers land in a common windrow. For example, if one were standing behind the crop inverter 100, the auger shown at the top of the FIG. would rotate in a counter clock-wise direction and the first auger below it would rotate in a clock-wise direction so that the peanut plants 220 passing over the augers landed in a common windrow 238 as is shown in FIG. 5. The pattern is repeated for the other two augers 180.

When two rows of peanut plants 220 are dug and inverted, the two rows will form a single windrow 238 having two sides which support each other. In other words, as the peanut pods 222 lean away from the auger 180 and trip rod 192 over which they have passed, they will lean against the other side of the windrow 238, which is, likewise, leaning away from the auger and trip rod over which it has passed.

As will also be appreciated, the second ends 180b of each pair of augers 180 are disposed further apart than the first ends 180a to achieve the angles discussed above. This outward slant assists the augers 180 in folding the peanut plants into a common windrow 238. It also lessens the impact to the peanut plants 220 as they are inverted, thereby overcoming the high loss rates of the prior art when the peanut plants are processed at high speeds.

The positioning rod 184 helps to channel the peanut plants 220 onto the rotating auger 180. The positioning rod 184 is not quite parallel to the auger 180 so as to make room for the flighting 184 on the auger. As has been discussed previously, the peanut plants 220 have a tendency to travel along the auger 180. To overcome this, the tapered flighting 188 is disposed on the auger 180 to channel the peanut plants 220 off the auger. However, the flighting 188 on the auger 180 is tapered to allow the plant to slide along the pipe 180 part way before being forced off.

The peanut plant 220 is pushed into contact with a trip rod 192 by the flighting 188. The trip rod 192 is positioned so that the peanut plant 220 contacts the trip rod 192 with the tap root 226 (FIG. 3), while the peanut plant is in an upright position. As the tap root 226 is held against the trip rod 192, the flighting 188 of the auger 180 pushes the peanut plant 220 over the top of the trip rod 192. This causes the peanut plant 220 to spin in the same rotation as the auger 180. When the peanut plant 220 is inverted, the flighting 188 of the auger 180 has pushed the plant far enough rearwardly that the plant slides off the end of the trip rod 192. The peanut plant 220 continues to spin for a short distance as it falls to the ground. Finally, the peanut plant 220 lands on the ground with the foliage 218 on the bottom and the pods 222 tipped away from the auger 180 and trip rod 192.

As the peanut plants 220 are being processed in the manner described above, the soil is also reformed by the mounder bar 140 to make a mound beneath the windrow 238. Prior to harvesting, there are two mounds 210 holding the peanut plants 220 as shown in the cut-away portion of FIG. 5. After the loosed peanut plants 220 are lifted from the ground, a plow shaped blade 260 and the mounder bar 140 are pulled through the soil. This blade 260 and mounder bar 140 accumulate soil from the furrow on the positioning rod 184 side of the auger 180 and pushes the soil to the trip rod 192 side of the furrow. Pushing the soil into this location creates the desired mound 242. The blade 260 and mounder bar 140 also level the soil making the mound top smooth. A depression 264 is left between mounds, and is typically 3 to 4 inches deep.

As has been mentioned previously, one of the principle advantages of forming such a mound below the windrow 238 is to allow rain water to run off the peanut plants 220. If the plants were deposited between two mounds, they could rest in the rain water and be unfit for consumption.

Another principle advantage to forming a mound 242 blow each windrow 238 is that the mounds aid in harvesting the peanut pods 222. Once they have dried, the peanuts pods 222 are picked up and thrashed by a combine. By placing the peanut plants 220 on a mound 242, the combine is given better access to the peanut plants 220 and is better able to pick them up.

Figure 6:
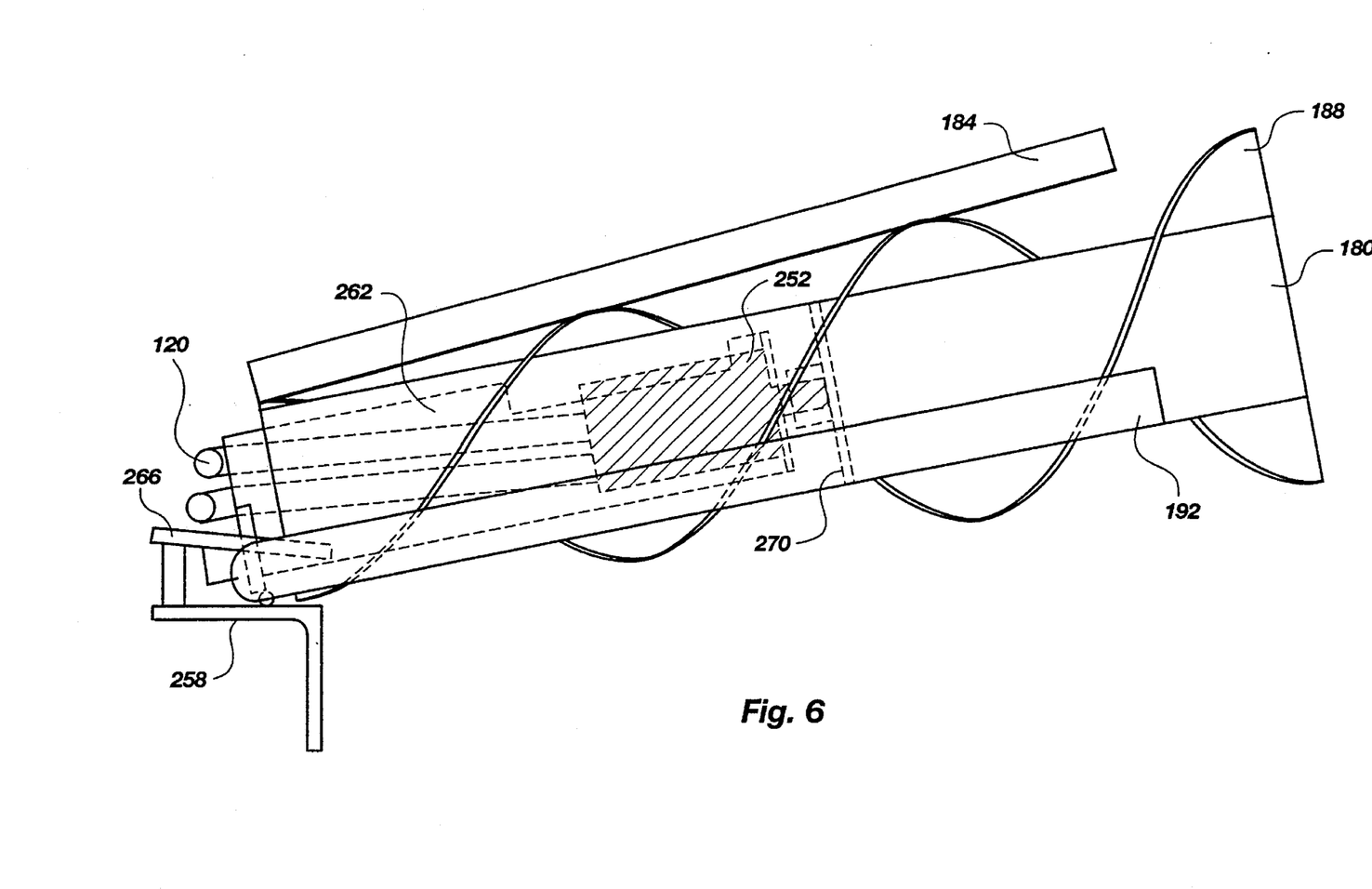
FIG. 6 shows a close-up view of the auger, positioning rod and trip rod of the crop inverter of the present invention.

Referring now to FIG. 6, there is shown a close-up view of the auger 180 and trip rod 192 of the crop inverter 100 (FIGS. 2, 3 and 5) of the present invention. Disposed adjacent the auger 180 are the positioning rod 184 and the tip rod 192 which have been discussed in detail with respect to prior figures. The tapered flighting 188 is also shown in FIG. 6.

The auger 180 is rotated in the desired direction by a second hydraulic motor 252 (the first being shown at 250 in FIG. 5). The motor 252 is typically disposed within the auger itself. A pair of hydraulic hoses 120 control the motor 252 so that the speed of the auger 180 can be synchronized with the speed of the pick-up mechanism 150 (FIGS. 2, 3 and 5) and the first and second slinger tubes 170 and 174. The hydraulic motor 252 is held in place by an auger motor mounting tube 262, such as those which will be known to persons skilled in the art of designing farm machinery.

The auger 180, the motor 252, the positioning rod 184 and the trip rod 192 are attached to the frame tubing 194 of the inverter 100 (FIGS. 2, 3 and 5) by an auger angle mount 258. An auger adjustment mechanism 266 is also provided to enable the farmer to adjust the position of the auger 180. This enables the farmer to adjust the auger 180, the positioning rod 184 and the trip rod 192 into a desired position. Thus, if a farmer raises two different types of peanuts, one having runner type foliage and the other having bunch type foliage, the farmer can adjust the auger 180 and the rods 184 and 192 to conform to the particular type of peanut plants being harvested.

Also shown in FIG. 6 is the taper of the flighting 188 which is disposed about the auger 180. The flighting 188 forces the peanut plants into contact with the trip rod 192 by its increasing size as it extends toward the end of the auger 180. The increased size of the flighting 188 causes the peanut plants to invert as they fall to the ground, as has been discussed with respect to the prior figures.

Thus there is disclosed a crop inverter made in accordance with the principles of the present invention. Those skilled in the art will appreciate that numerous modifications can be made without departing from the scope and spirit of the present invention. The appended claims are intended to cover such modifications. An aid to correlating the embodiment described to the figures shown in the drawings is provided:

CATALOGUE OF ELEMENTS 100 crop inverter
104 three-point hitch
108 coulter mount
112 coulter
116 coulter spring
120 hydraulic hoses
124 replaceable wear point
128 chain case
132 cutter bar
136 kicker tube
140 mounder bar
144 belly shank
150 pick-up mechanism
154 pick-up head tube
158 fingers
162 rotor rod
166 foliage shield
170 first slinger tube
174 second slinger tube
180 auger
184 positioning rod
188 flighting
192 trip rod
194 frame tubing
196 tool bar
198 guy rod
200 wheel
204 wheel support
210 peanut mound
214 crest
218 peanut plant foliage
220 peanut plant
222 peanut pods
226 tap roots
230 ground level
234 soil
238 windrow
246 mounds
246 drive line
250 hydraulic motor
252 second hydraulic motor
254 hydraulic flow controls
258 auger angle mount
260 blade
262 auger motor mounting tube
266 auger adjustment mechanism
270 auger/motor connection

What is claimed is:

1. An inverter for digging and inverting crops having pods which are disposed in soil, the inverter comprising:

digging means for loosening soil and for lifting the crops from the soil, the digging means comprising a first rotating bar disposable below the pods of the crop so as to sever roots extending below the pods and a second rotating bar disposed at a level adjacent said pods and disposed such that rotation of the second rod lifts the pods in the soil;

pick-up means for lifting the crops above the soil and for allowing soil to fall from the crops;

inverting means for inverting the crops from an upright growing orientation and placing the crops in a windrow such that the pods are disposed on top of the windrow; and slinger means disposed between the pick-up means and the inverter means for conveying the crops between the pick-up means and the inverter means and for removing soil from the crops, the slinger means comprising at least one rotatable tube.

2. The inverter of claim 1, wherein the second rotating bar has a larger cross-sectional area than the first rotating bar.

3. The inverter of claim 1, wherein the pick-up means comprises a rotatable pick-up head tube with a plurality of fingers pivotably disposed thereon.

4. The inverter of claim 1, wherein the fingers of the pick-up means are attached so as to pivot as they withdraw from crops lifted by the pick-up means so as to prevent the fingers from becoming tangled with the crops.

5. The inverter of claim 1, wherein the slinger means comprises a first rotatable tube and a second rotatable tube disposed generally parallel with one another so as to convey the crops from the pick-up means to the inverter means.

6. The inverter of claim 5, wherein the first rotatable tube has a plurality of edges formed thereon so as to vibrate the crops as they pass over the first rotatable tube.

7. The inverter of claim 6, wherein the first rotatable tube has a cross-sectional shape chosen from one of the group consisting of a square, a pentagon, a hexagon, a heptagon and an octagon.

8. The inverter of claim 1, wherein the pick-up means rotates about a first axis, and the inverting means comprises a plurality of augers disposed to rotate about a second axis, transverse to the first axis.

9. The inverter of claim 8, wherein the second axis is disposed at an angle at least 45 degrees from the first axis.

10. A crop inverter for digging and inverting crops planted in soil, the inverter comprising:

digging means for lifting the crops on top of the soil;

pick-up means disposed adjacent the digging means for lifting the crops above the soil; and inverting means disposed adjacent the pick-up means for inverting the plant as it passes through the inverting means, the inverting means comprising a pair of augers extending rearwardly from the pick-up means, each auger having a first, attached end connected to the pick-up means and a second end opposite the first end, wherein the second ends of the augers are spaced apart at least as far as the first ends, and wherein the augers rotate such that crops passing over each auger are directed to a position between the augers.

11. The crop inverter of claim 10, wherein the crop inverter has a direction of travel, and wherein the augers are disposed between about 0 degrees and 45 degrees transverse to the direction of travel.

12. The crop inverter of claim 11, wherein the augers are positioned between 5 degrees and 30 degrees from the direction of travel, and such that the second ends of the augers are spaced further apart than the first ends.

13. The crop inverter of claim 12, wherein the augers are disposed at about 15 degrees transverse to the direction of travel.

14. The crop inverter of claim 10, wherein the inverter means comprises positioning means disposed adjacent each auger for channeling crops onto the auger for inverting.

15. The crop inverter of claim 14, wherein the positioning means comprises a rod disposed generally parallel with the auger.

16. The crop inverter of claim 10, wherein each auger comprises a means for channeling crops off the auger.

17. The crop inverter of claim 16, wherein the channeling means comprises a flighting disposed about the auger.

18. The crop inverter of claim 17, wherein the flighting is tapered and disposed about the auger in a helical pattern.

19. The crop inverter of claim 18, wherein the flighting has a first end disposed adjacent the first end of the auger and a second end disposed adjacent the second end of the auger, and wherein the second end of the flighting is larger than the first end.

20. The crop inverter of claim 17, wherein the auger is formed of metal and the flighting is formed of plastic.

21. The crop inverter of claim 17, wherein the auger and flighting are made of plastic.

22. The crop inverter of claim 17, wherein the inverter means further comprises a tripping means disposed adjacent the flighting of each auger so as to trip crops forced off the auger by the flighting.

23. The crop inverter of claim 22, wherein the tripping means comprises a pair of trip rods, one trip rod being disposed adjacent with and generally parallel to each auger.

24. The crop inverter of claim 10, wherein the inverter means further comprises a tripping means disposed adjacent each auger.

25. The crop inverter of claim 24, wherein the tripping means comprises a pair of trip rods, one trip rod being disposed adjacent to each auger.

26. The crop inverter of claim 25, wherein each auger has a central axis about which the auger rotates, and wherein the trip rod adjacent each auger is disposed below the central axis.

27. The crop inverter of claim 10, wherein each auger is disposed such that the second end of each auger is higher than the first end so that the auger is inclined.

28. The crop inverter of claim 27, wherein each auger is inclined between about 1 degree and 20 degrees.

29. The crop inverter of claim 28, wherein the auger is inclined at 10 degrees.

30. The crop inverter of claim 10, wherein the inverting means further comprises a motor means for rotating the augers, the motor means being disposed within the augers.

31. The crop inverter of claim 30, wherein the motor comprises a motor and a hydraulic control means for varying a speed at which the motor rotates the auger.

32. The crop inverter of claim 10, wherein the inverter means comprises adjustable attachment means for attaching the augers so as to enable movement of the augers toward and away from one another.

33. The crop inverter of claim 10, wherein the crop inverter further comprises mounding means for forming a mound between and below the augers, such that crops inverted by the augers come to rest on the mound.

34. A method for harvesting peanut plants having pods disposed below a soil surface and having roots extending downwardly therefrom, the method comprising:

a) passing a first rotating bar through the soil below the peanut pods so as to sever the roots of the pods; and b) passing a second rotating bar through the soil at a level of the peanut pods, and rotating the second rotating bar in a direction so as to cause the peanut plants to be lifted to the soil surface.

35. The method according to claim 34, wherein the method comprises, more specifically, rotating the second rotating bar opposite a forward direction of movement.

36. The method according to claim 34, wherein the method comprises, more specifically, providing a first rotating bar with a first cross-sectional area, and a second rotating bar has a second cross-sectional area larger than the first cross-sectional area so as to move a larger amount of soil and cause the peanut pods to rise to the surface of the soil.

37. The method according to claim 34, wherein the method comprises providing first and second rotating bars which have generally square cross-sectional shapes.

38. The method according to claim 34, wherein the method further comprises:

c) lifting the peanut pods from the soil by a pick-up mechanism.

39. The method according to claim 38, wherein the method further comprises:

d) passing the peanut pods over a rotating slinger mechanism so as to move the pods away from the pick-up mechanism, and so as to remove soil from the pods.

40. The method according to claim 39, wherein step d) comprises providing at least one rotating tube having a generally noncircular cross-sectional area such that as the pods are passed the rotating tube, the pods are vibrated to remove soil therefrom.

41. The method according to claim 39, wherein the method further comprises:

e) inverting the peanut plants and placing them on the ground so that the pods are disposed on top of the plant.

42. The method according to claim 41, wherein step e) comprises, more specifically, moving the peanut plant along a rotating auger and causing the plant to contact a trip rod so as to cause the plant to invert.

43. The method according to claim 42, wherein the method comprises, more specifically, providing a slinger mechanism which is disposed to rotate about a first axis, and disposing the rotating auger along a second axis transverse to the first axis.

44. The method according to claim 43, wherein the method comprises, more specifically, moving the peanut plant along an auger which is inclined upwardly as it extends away from the first axis.

45. The method according to claim 42, wherein the method comprises, more specifically, providing a tapered flighting about the auger for causing the peanut plants to contact the trip rod.

* * * * *